United States Patent
Zhang et al.

(10) Patent No.: US 11,102,540 B2
(45) Date of Patent: Aug. 24, 2021

(54) METHOD, DEVICE AND SYSTEM FOR SYNCHRONOUSLY PLAYING MESSAGE STREAM AND AUDIO-VIDEO STREAM

(71) Applicant: WANGSU SCIENCE & TECHNOLOGY CO., LTD., Shanghai (CN)

(72) Inventors: Jun Zhang, Shanghai (CN); Jianwu Huang, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 7 days.

(21) Appl. No.: 16/544,991

(22) Filed: Aug. 20, 2019

(65) Prior Publication Data

US 2020/0322670 A1 Oct. 8, 2020

Related U.S. Application Data

(63) Continuation of application No. PCT/CN2019/086061, filed on May 8, 2019.

(30) Foreign Application Priority Data

Apr. 4, 2019 (CN) .......................... 201910272614.8

(51) Int. Cl.
*H04N 21/43* (2011.01)
*H04N 21/2187* (2011.01)
(Continued)

(52) U.S. Cl.
CPC ......... *H04N 21/4307* (2013.01); *G09B 5/065* (2013.01); *H04N 21/2187* (2013.01);
(Continued)

(58) Field of Classification Search
None
See application file for complete search history.

(56) References Cited

U.S. PATENT DOCUMENTS 6,163,647 A * 12/2000 Terashima ........... H04N 9/8042
386/201
6,173,317 B1 * 1/2001 Chaddha ................. H04L 29/06
709/219

(Continued)

FOREIGN PATENT DOCUMENTS

CN 1444829 A 9/2003
CN 102655606 A 9/2012
(Continued)

OTHER PUBLICATIONS

Search Report for Chinese Patent Application No. 201910272614.8 dated Nov. 26, 2019.

(Continued)

*Primary Examiner* — Jefferey F Harold
*Assistant Examiner* — Timothy R Newlin
(74) *Attorney, Agent, or Firm* — Heslin Rothenberg Farley & Mesiti P.C.

(57) ABSTRACT

The present disclosure discloses a method, device and system for synchronously playing a message stream and an audio-video stream, and involves in the field of streaming media live broadcast technology. In the present disclosure, a stream-pulling terminal pulls an audio-video stream from an audio-video server and plays the audio-video stream, pulls a message stream from a message server and caches the message stream (201). Herein, each audio-video frame in the audio-video stream is supplemented with an audio-video timestamp, each message in the message stream is supplemented with a message timestamp, and time sources taken by the audio-video timestamp and of the message timestamp are synchronous time sources. The stream-pulling terminal (Continued)

determines a message synchronously played with an audio-video frame to be played in a cached message stream in accordance with the audio-video timestamp of the audio-video frame and the message timestamp of the message, and plays the message (202).

9 Claims, 8 Drawing Sheets

(51) Int. Cl.
*G09B 5/06* (2006.01)
*H04N 21/8547* (2011.01)
*H04N 21/81* (2011.01)
*H04N 21/433* (2011.01)

(52) U.S. Cl.
CPC ..... *H04N 21/4331* (2013.01); *H04N 21/8126* (2013.01); *H04N 21/8547* (2013.01)

(56) References Cited

U.S. PATENT DOCUMENTS

| | | | | |
|---|---|---|---|---|
| 6,452,615 | B1* | 9/2002 | Chiu | G11B 27/28 715/776 |
| 6,493,872 | B1* | 12/2002 | Rangan | H04N 7/083 725/32 |
| 6,697,569 | B1* | 2/2004 | Gomez | H04N 21/4786 386/201 |
| 6,701,383 | B1* | 3/2004 | Wason | G06Q 10/10 375/E7.025 |
| 9,306,989 | B1* | 4/2016 | Jayaram | H04N 21/4788 |
| 2001/0023436 | A1* | 9/2001 | Srinivasan | H04N 21/812 709/219 |
| 2007/0273754 | A1* | 11/2007 | Cockerton | H04N 21/858 348/14.08 |
| 2008/0304573 | A1* | 12/2008 | Moss | H04N 21/4622 375/240.28 |
| 2015/0296228 | A1* | 10/2015 | Chen | G06F 16/78 725/34 |
| 2017/0039867 | A1* | 2/2017 | Fieldman | G11B 27/031 |
| 2019/0045259 | A1* | 2/2019 | Beardsley | G06F 1/12 |

FOREIGN PATENT DOCUMENTS

| | | |
|---|---|---|
| CN | 105323655 A | 2/2016 |
| CN | 106303295 A | 1/2017 |
| CN | 106326343 A | 1/2017 |
| CN | 106816055 A | 6/2017 |
| CN | 106993239 A | 7/2017 |
| CN | 107666619 A | 2/2018 |
| CN | 107743247 A | 2/2018 |
| CN | 108123866 A | 6/2018 |
| CN | 108156480 A | 6/2018 |
| CN | 108600773 A | 9/2018 |
| CN | 109547831 A | 3/2019 |
| EP | 2840803 A1 | 2/2015 |
| EP | 3334175 A1 | 6/2018 |

OTHER PUBLICATIONS

International Search Report for International Application No. PCT/CN2019/086061 dated Jan. 6, 2020.
Extended European Search Report for European Application No. 19752632.0 dated Apr. 20, 2020.
Communication pursuant to Article 94(3) EPC for European Patent Application No. 19752632.0 dated Mar. 11, 2021.

* cited by examiner

METHOD, DEVICE AND SYSTEM FOR SYNCHRONOUSLY PLAYING MESSAGE STREAM AND AUDIO-VIDEO STREAM

CROSS REFERENCE TO RELATED APPLICATIONS

The present disclosure is a continuation of International application No. PCT/CN2019/086061, filed on May 8, 2019, which is based on the Chinese patent application No. 201910272614.8, filed on Apr. 4, 2019 and entitled "METHOD, DEVICE AND SYSTEM FOR SYNCHRONOUSLY PLAYING MESSAGE STREAM AND AUDIO-VIDEO STREAM", which are incorporated in their entirety into this disclosure by reference.

TECHNICAL FIELD

The present disclosure relates to streaming media live broadcast technology, especially to a method, a device and a system for synchronously playing a message stream and an audio-video stream.

BACKGROUND

With a continuous development of electronic devices and the Internet, the education industry has evolved from traditional classroom education to Internet-based online live broadcast education. Besides, online live broadcast education is no longer merely a teacher's live teaching, but multiple ways of interaction such as whiteboard, text chatting and roll call are supplemented. In this way, a teacher may teach more vividly.

In the online live education process, on the one hand, a teacher terminal which the teacher uses can collect an audio-video stream generated during a live broadcast by live broadcast devices such as a personal computer, a camera, or a headset, and then can push the audio-video stream to a corresponding audio-video server. The audio-video stream, after being processed by the audio-video server, may be pulled from the audio-video server into a student terminal which the student uses by a live broadcast device for viewing. On the other hand, a message stream, for example, a whiteboard, text chatting and roll call, generated during the live broadcast may be pushed to a corresponding message stream server via a live broadcast device of a stream-pushing terminal (teacher terminal or student terminal), and then the message stream may be pulled by a live broadcast device of a stream-pulling terminal (student terminal or teacher terminal) from the message stream server and the message may be presented to a viewer (a student or a teacher).

During the process of realizing the present disclosure, the inventor found that at least the following problems exist in existing technologies:

Even if the known real time messaging protocol (RTMP) which has the shortest delay of time is applied, 2-3 seconds are required from collecting an audio-video stream to pulling the stream and watching. Besides, a message stream, for example, a whiteboard, text chatting and roll call, only concern transmission of a text stream which does not require any complicated stream processing but basically is a real time transmission, resulting in that a message stream reaches a viewing terminal earlier than an audio-video stream. A viewing terminal, however, live broadcasts an audio-video stream or a text stream immediately receiving the audio-video stream or the text stream, resulting in that a message, such as the whiteboard and text chatting, and the corresponding audio-video cannot be played synchronously, thereby worsening interaction and experience of online live broadcast education.

SUMMARY

In order to overcome the above problem, some embodiments of the present disclosure provide a method, a device and a system for synchronously playing a message stream and an audio-video stream.

In a first aspect, a method for synchronously playing a message stream and an audio-video stream is provided, and the method is executed at a stream-pulling terminal, and includes:

pulling an audio-video stream from an audio-video server and playing the audio-video stream, pulling a message stream from a message server and caching the message stream, herein each audio-video frame in the audio-video stream is supplemented with an audio-video timestamp, each message in the message stream is supplemented with a message timestamp, and time sources taken by the audio-video time stamp and the message time stamp are synchronous time sources;

determining a message in a cached message stream which is synchronously played with an audio-video frame to be played in accordance with the audio-video timestamp of the audio-video frame and the message timestamp of the message, and playing the message.

In a second aspect, a method for synchronously playing a message stream and an audio-video stream is provided. The method is executed at a stream-pushing terminal, and includes:

supplementing an audio-video timestamp to each audio-video frame in a collected audio-video stream, and supplementing a message timestamp to each message in a collected message stream, herein a local time of a stream-pulling terminal is used in the audio-video timestamp and in the message timestamp;

pushing the audio-video stream to an audio-video server, and pushing the message stream to a message stream server, so that the stream-pulling terminal pulls an audio-video stream from the audio-video server and plays the audio-video stream, pulls a message stream from the message server and caches the message stream, determines a message in a cached message stream which is synchronously played with an audio-video frame to be played in accordance with the audio-video timestamp of the audio-video frame and the message timestamp of the message, and plays the message.

In a third aspect, a method for synchronously playing a message stream and an audio-video stream is provided, and the method includes:

receiving, by an audio-video server, an audio-video stream, and supplementing each audio-video frame in a received audio-video stream with an audio-video timestamp;

receiving, by a message server, a message stream, and supplementing each message in a received message stream with a message timestamp, herein a server time of the message server and a server time of the audio-video server keep synchronous.

In a fourth aspect, a stream-pulling terminal is provided. The stream-pulling terminal includes:

a stream-pulling module, configured to pull an audio-video stream from an audio-video server and playing the audio-video stream, pull a message stream from a message server and cache the message stream, herein each audio-video frame in the audio-video stream is supplemented with an audio-video timestamp, each message in the message stream is supplemented with a message timestamp, and time sources taken by the audio-video timestamp and the message timestamp are synchronous time sources;

a synchronously-playing module, configured to determine a message in a cached message stream which is synchronously played with an audio-video frame to be played in accordance with the audio-video timestamp of the audio-video frame and the message timestamp of the message, and to play the message.

In a fifth aspect, a stream-pushing terminal is provided. The stream-pushing terminal includes:

a timestamp module, configured to supplement an audio-video timestamp to each audio-video frame in a collected audio-video stream, and to supplement a message timestamp to each message in a collected message stream, herein a local time of a stream-pulling terminal is used in the audio-video timestamp and in the message timestamp;

a pushing module, configured to push the audio-video stream to an audio-video server, and to push the message stream to a message stream server.

In a sixth aspect, a system for synchronously playing a message stream and an audio-video stream is provided. The system includes an audio-video server and a message server, where:

the audio-video server is configured to receive an audio-video stream, and to supplement each audio-video frame in a received audio-video stream with an audio-video timestamp;

the message server is configured to receive a message stream, and to supplement each message in a received message stream with a message timestamp, herein a server time of the message server and a server time of the audio-video server keep synchronous.

In a seventh aspect, a system for synchronously playing a message stream and an audio-video stream is provided. The system includes the stream-pulling terminal in accordance with the above-described fourth aspect, the stream-pushing terminal in accordance with the above-described fifth aspect, and the audio-video server and the message server in accordance with the above-described sixth aspect.

The technical solutions provided in the embodiments of the present disclosure have the following advantages.

In this embodiment, after receiving a message stream, the stream-pulling terminal may cache rather than play the message stream immediately. In the meantime, the stream-pulling terminal may determine a message with a message timestamp earlier than or the same as an audio-video timestamp of the audio-video frame as a message played synchronously with the audio-video frame on the basis of an audio-video timestamp of an audio-video stream and a message timestamp of a message stream taken from the same time source. In this way, when the stream-pulling terminal plays the audio-video frame, if there is a synchronously-played message, the stream-pulling terminal may synchronously play the audio-video frame and the corresponding message. If there is no synchronously-played message, the stream-pulling terminal may only play the audio-video frame. By controlling the timing of playing the message, the problem of being asynchronous caused by real-time playing of the pulled message may be avoided, thereby improving interaction and experience of the online live broadcast education.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION

In order to clarify the objective, the technical solutions and the advantages of the present disclosure, the embodiments of the present disclosure will be further described in details with reference to the accompany drawings.

Figure 1:
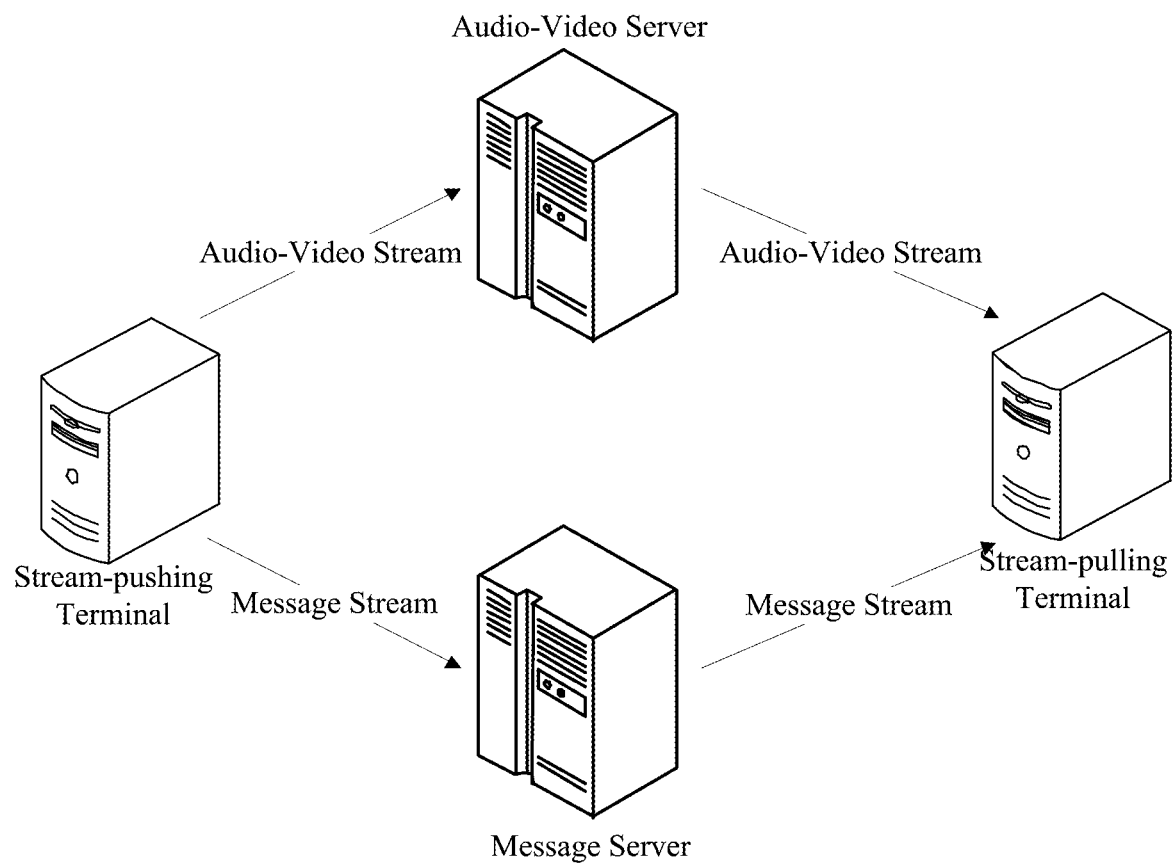
FIG. 1 is a schematic structural view of a system for synchronously playing a message stream and an audio-video stream provided in an embodiment of the present disclosure.

An embodiment of the present disclosure provides a method for synchronously playing a message stream and an audio-video stream, and the method may be jointly implemented by a stream-pushing terminal, an audio-video server, a message server and a stream-pulling terminal. When the stream-pushing terminal pushes an audio-video stream, the stream-pushing terminal may be a live broadcast device deployed at a teacher terminal, and the stream-pushing terminal may convert an image and sound of the teacher during teaching into an audio-video stream to be pushed to the audio-video server. The stream-pulling terminal may be a live broadcast device located at a student terminal, and the stream-pulling terminal may pull from the audio-video server and play the audio and video. When the stream-pushing terminal pushes a message stream, the stream-pushing terminal may be a live broadcast device deployed at a teacher terminal or a student terminal, and the stream-pushing terminal may push a generated message stream to the message stream server. The stream-pulling terminal may be a live broadcast device deployed at a student terminal or a teacher terminal, and the stream-pulling terminal may pull from the message stream server and play the message stream (herein referred to as rendering the message stream and displaying the message stream). The above-described audio-video server and message server may be any CDN node server in a Content Delivery Network (CDN) system, and the CDN node server may distribute cached audio-video streams and message streams to each stream-pulling terminal. A particular system framework is shown in FIG. 1. Each of the above-described stream-pushing terminal, audio-video server, message server and stream-pulling terminal may include a processor, a memory and a transceiver. The processor may be configured to process synchronous playing of a message stream and an audio-video stream, the memory may be configured to store data wanted and data generated during the process, and the transceiver may be configured to receive and transmit related data during the process.

Figure 2:
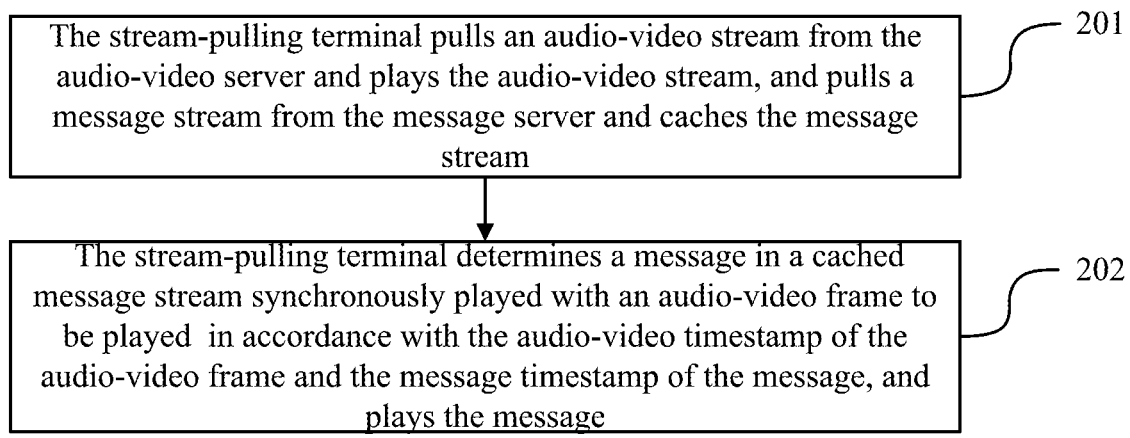
FIG. 2 is a flow chart of a method for synchronously playing a message stream and an audio-video stream provided in an embodiment of the present disclosure.

Steps of a method for synchronously playing a message stream and an audio-video stream as shown in FIG. 2 are described in detail below with reference to specific embodiments. The content may be as follows.

In step 201, the stream-pulling terminal pulls an audio-video stream from the audio-video server and plays the audio-video stream, and pulls a message stream from the message server and caches the message stream.

In practice, a student terminal is taken as an example of the stream-pulling terminal. When a student intends to watch a certain live broadcast course, he/she may open a video playing software that supports online live broadcast education on a live broadcast device like a smart phone or a computer, and may then search for the above-described live broadcast course in the video playing software and click the play button. In this way, the stream-pulling terminal may pull the audio-video stream from the audio-video server where the audio-video stream of the live broadcast course is cached and play the audio-video stream. In the meantime, the stream-pulling terminal may pull the message stream from the message server where the message stream is cached, and cache the message stream in the stream-pulling terminal which plays the message stream when the message stream meets a requirement for playing. It shall be noted that both the audio-video stream and the message stream pulled by the stream-pulling terminal are supplemented with a timestamp from synchronous time sources. In this way, an audio-video frame and a message that are generated at the same time may be marked accurately through a timestamp from the same time source, which may later be considered as a basis for determination on synchronous playing of an audio-video stream and a message stream. Specifically, both the stream-pushing terminal and the server may perform process of adding a timestamp. If the stream-pushing terminal adds the timestamp, the above-described requirement on synchronous time source may be met as long as the stream-pushing terminal adds the timestamp to a recorded audio-video stream and a message stream generated on the basis of the same time source such as a local time of the stream-pushing terminal. If the server adds the timestamp, the above-described requirement on synchronous time source may be met as long as a synchronous calibration processing is performed on a server time of the audio-video server and a server time of the message server.

In step 202, the stream-pulling terminal determines a message in a cached message stream which is synchronously played with an audio-video frame to be played in accordance with the audio-video timestamp of the audio-video frame and the message timestamp of the message, and plays the message.

In implementation, after finishing caching the message stream, the stream-pulling terminal may control a timing for playing a message in the message stream to realize a synchronous playing of the message and the corresponding audio-video frame. Specifically, the stream-pulling terminal may determine a message in a cached message stream which is synchronously played with each audio-video frame to be played in accordance with the audio-video timestamp of each audio-video frame in the audio-video stream and the message timestamp of each message in the message stream. In this way, when the stream-pulling terminal plays the audio-video frame, the stream-pulling terminal may synchronously play the audio-video frame and the corresponding message if the synchronously-played message exists, while the stream-pulling terminal may only play the audio-video frame if no synchronously-played message exists. It shall be noted that after a certain message is finished playing, the message may be discarded, for example, may be deleted from the cached message or marked as discarded data, in order to avoid playing the same message repeatedly for multiple times. In this way, by controlling the timing of playing the message, the problem of being asynchronous caused by real time playing of the pulled message can be avoided, thereby improving interaction and experience during the online live broadcast education.

Alternatively, the above-described step 202 may specifically be as follows: a message with a message timestamp in the cached message stream earlier than or the same as an audio-video timestamp of the audio-video frame to be played is determined as a message played synchronously with the audio-video frame to be played.

Figure 3:
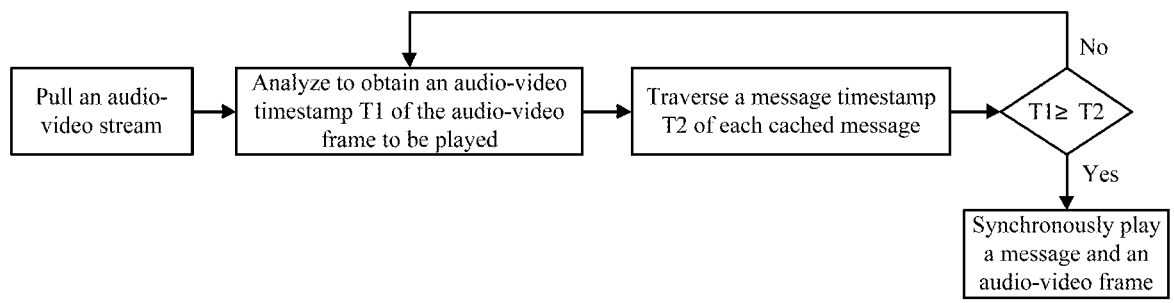
FIG. 3 is a flow chart of a method for synchronously playing a message stream and an audio-video stream provided in another embodiment of the present disclosure.

In implementation, in order to realize synchronous playing of the message stream and the audio-video stream, the stream-pulling terminal, upon the message stream is obtained, does not play but caches the message stream until the stream-pulling terminal obtains an audio-video frame corresponding to the message. After the corresponding audio-video frame of the message is obtained, the stream-pulling terminal synchronously plays the message and the corresponding audio-video frame. Specifically, before playing each audio-video frame, the stream-pulling terminal may search an unplayed message for whether a message synchronously played with a current audio-video frame to be played exists by comparing the message timestamp with the audio-video timestamp in terms of which is earlier or later. The stream-pulling terminal may traverse message timestamps of each cached message on the basis of the first in first out (FIFO) principle. If a message with a message timestamp earlier than or the same as the audio-video timestamp of an audio-video frame to be played, the stream-pulling terminal may determine the message as a message played synchronously with the audio-video frame to be played. If message timestamps of all cached messages are later than the audio-video timestamp of the audio-video frame to be played, it means that the stream-pulling terminal has not obtained audio-video frames corresponding to the respective cached messages. Here the stream-pulling terminal does not play a message in the message stream, until a new audio-video frame is obtained, and until a message with message timestamp earlier than or the same as the audio-video timestamp of the audio-video frame to be played, then the message will be played synchronously. The above-described is shown in FIG. 3.

Figure 4:
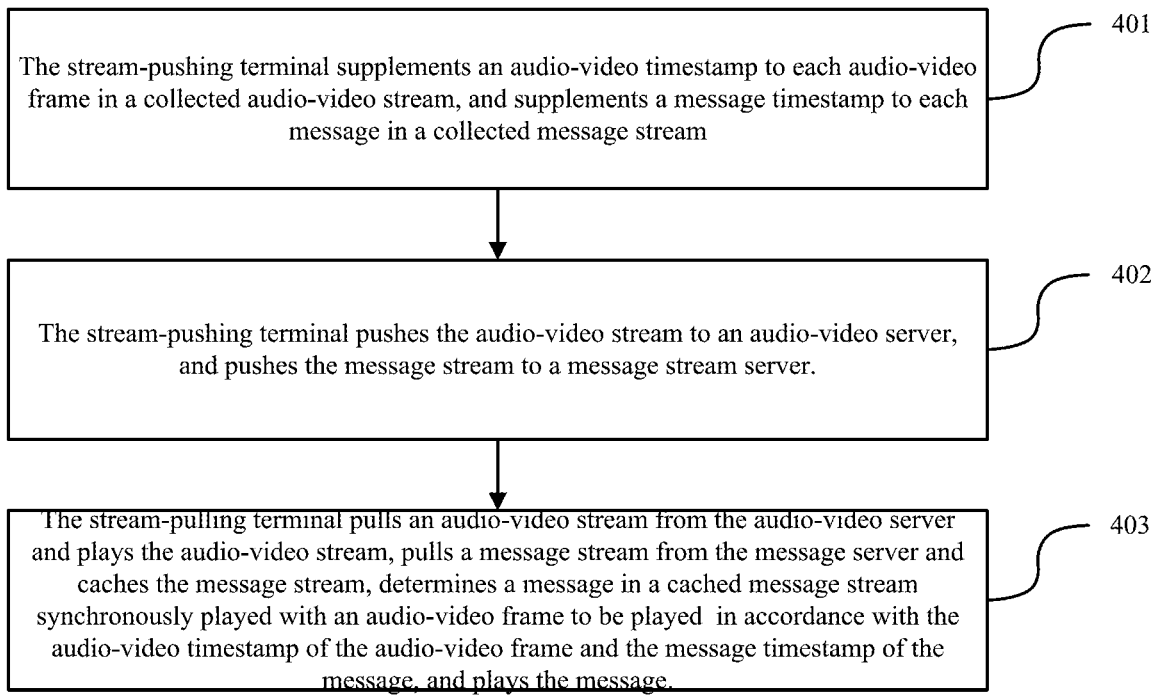
FIG. 4 is a flow chart of a method for synchronously playing a message stream and an audio-video stream provided in a further embodiment of the present disclosure.

Alternatively, if the stream-pulling terminal supplements a timestamp, the processing of synchronously playing the message stream and the audio-video stream is shown in FIG. 4, which specifically is as follows.

In step 401, the stream-pushing terminal supplements an audio-video timestamp to each audio-video frame in a collected audio-video stream, and supplements a message timestamp to each message in a collected message stream.

In implementation, a teacher terminal is taken as an example of the stream-pushing terminal. A teacher may live broadcast his/her courses through a corresponding live broadcast device, and may use interactive means such as a whiteboard, text chatting and roll call during the live broadcast. In this way, the stream-pushing terminal may collect an audio-video stream and a message stream, and the stream-pushing terminal may supplement an audio-video timestamp to each audio-video frame in the collected audio-video stream based on a local time of the stream-pushing terminal, and supplement a message timestamp to each message in the collected message stream.

Alternatively, the above-described step 401 may specifically be as follows: the stream-pushing terminal writes a local acquisition time of each audio-video frame in the audio-video stream into a supplemental enhancement information (SEI) field of the audio-video frame, and the stream-pushing terminal writes a local acquisition time of each message in the message stream into a timestamp field of each message.

In implementation, after the stream-pushing terminal collects a certain audio-video frame, the local acquisition time of the audio-video frame may be written into the supplemental enhancement information (SEI) field as an audio-video timestamp of the audio-video frame. Correspondingly, after the stream-pushing terminal collects a certain message, the local acquisition time of the message may be written into a timestamp field of the message. For example, if the stream-pushing terminal collects a message { "msg":"A"} at a local time of 11:12:27, Apr. 3, 2019, the stream-pushing terminal may convert the local acquisition time of the message into a unix timestamp to be written into the timestamp field of "timestamp" of the message, i.e., {"msg": "A","timestamp":"1554261147000"}.

In step 402, the stream-pushing terminal pushes the audio-video stream to an audio-video server, and pushes the message stream to a message stream server.

Figure 5:
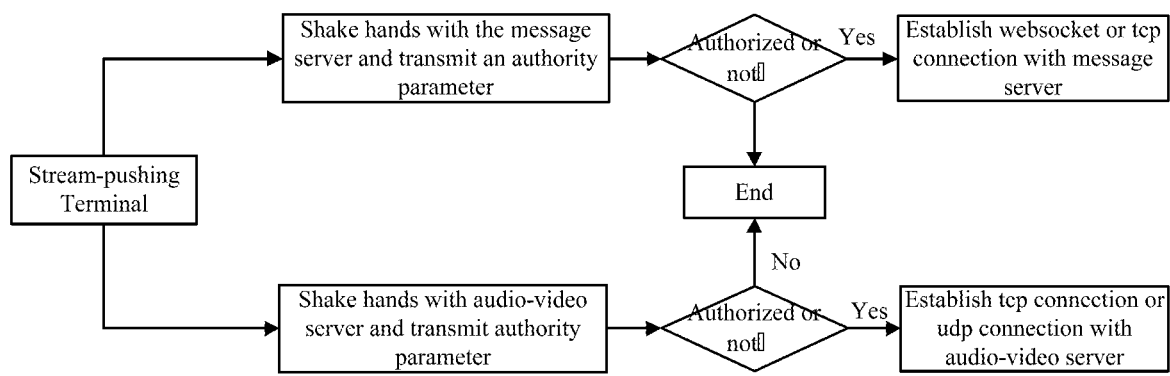
FIG. 5 is a flow chart of establishing a connection provided in an embodiment of the present disclosure.

In implementation, before respectively pushing an audio-video stream and a message stream to the audio-video server and the message stream server, the stream-pushing terminal may perform process such as authentication, connection establishment and the like on the audio-video server and the message stream server in advance, as shown in FIG. 5.

In step 403, the stream-pulling terminal pulls an audio-video stream from the audio-video server and plays the audio-video stream, pulls a message stream from the message server and caches the message stream, determines a message in a cached message stream which is synchronously played with an audio-video frame to be played in accordance with the audio-video timestamp of the audio-video frame and the message timestamp of the message, and plays the message.

Figure 6:
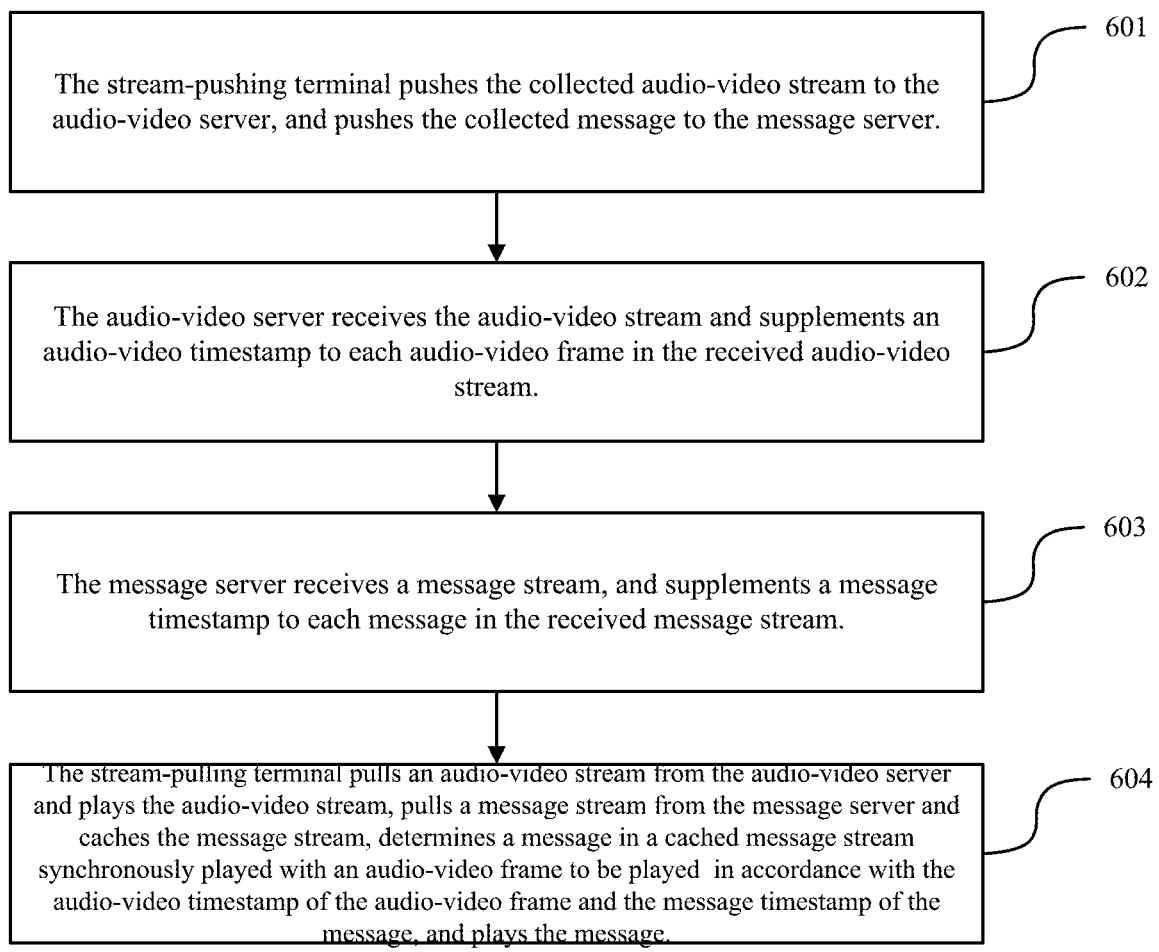
FIG. 6 is a flow chart of a method for synchronously playing a message stream and an audio-video stream provided in an embodiment of the present disclosure.

Alternatively, if a server supplements a timestamp, the processing of synchronously playing the message stream and the audio-video stream is shown as FIG. 6, which specifically is as follows.

In step 601, the stream-pushing terminal pushes the collected audio-video stream to the audio-video server, and pushes the collected message to the message server.

In step 602, the audio-video server receives the audio-video stream and supplements an audio-video timestamp to each audio-video frame in the received audio-video stream.

In implementation, similar to the stream-pushing terminal supplementing an audio-video timestamp, the audio-video server, after receiving a certain audio-video frame, may write the time that the audio-video server acquires the audio-video frame, i.e., the audio-video frame acquisition time, into the SEI field of the audio-video frame as the audio-video timestamp of the audio-video frame.

In step 603, the message server receives a message stream, and supplements a message timestamp to each message in the received message stream.

In implementation, similar to supplementing a message timestamp to the above-described stream-pushing terminal, the message server, after receiving a certain message, may write the time that the message server acquires the message, i.e., the message acquisition time, into the timestamp field of the message as the message timestamp of the message. It shall be noted that the server time of the message server and the server time of the audio-video server need to keep synchronous to accurately mark the audio-video frame and message generated at the same time.

In step 604, the stream-pulling terminal pulls an audio-video stream from the audio-video server and plays the audio-video stream, pulls a message stream from the message server and caches the message stream, determines a message in a cached message stream which is synchronously played with an audio-video frame to be played in accordance with the audio-video timestamp of the audio-video frame and the message timestamp of the message, and plays the message.

Figure 7:
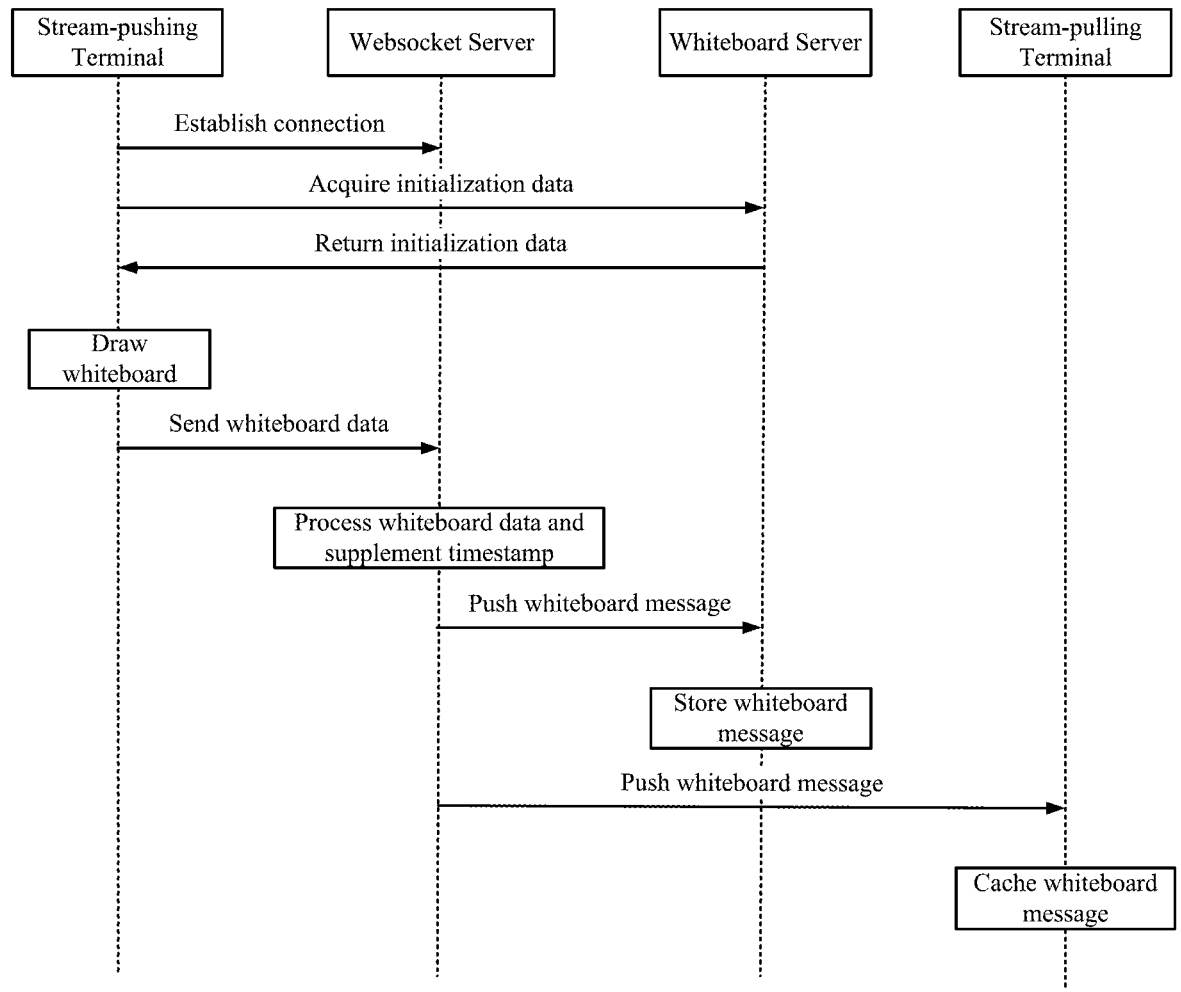
FIG. 7 is a sequence diagram provided in an embodiment of the present disclosure.

The whiteboard message is taken as an example to further describe synchronous playing of a message stream and an audio-video stream. FIG. 7 shows a sequence diagram that a whiteboard message is processed between the devices. Herein, a websocket server is one type of server of the above-described message server, and the websocket server may carry out data processing for the whiteboard message, for example, supplementing a message timestamp. As s whiteboard platform, a whiteboard server may provide a corresponding background technical support such as configuring a whiteboard authority or a whiteboard background picture. In the meantime, the whiteboard server may store whiteboard data generated during a live broadcast. First of all, the stream-pushing terminal may establish a connection channel with the websocket server, then the stream-pushing terminal may acquire initialization data from the whiteboard server to perform an initialization operation of the whiteboard, and returns the initialized whiteboard data to the whiteboard server after the initialization is finished. Thereafter, a stream-pushing terminal may execute a whiteboard drawing command issued by the teacher terminal or the student terminal to draw the whiteboard, and send the whiteboard data to the websocket server through the above-described connection channel. Afterwards, the websocket server may process the whiteboard data, for example, supplementing a message timestamp, after which is finished the processed whiteboard data is pushed to the whiteboard server and the stream-pulling terminal respectively. The whiteboard server may store the received whiteboard data to facilitate processing like playback. The stream-pulling terminal may cache the received whiteboard data locally, and then determine when to play the whiteboard data based on the message timestamp in the whiteboard data and the audio-video timestamp of the audio-video frame.

In this embodiment, after receiving a message stream, the stream-pulling terminal may cache rather than play the message stream immediately. In the meantime, the stream-pulling terminal may determine a message with a message timestamp earlier than or the same as an audio-video timestamp of the audio-video frame as a message played synchronously with the audio-video frame on the basis of an audio-video timestamp of an audio-video stream and a message timestamp of a message stream taken from the same time source. In this way, when the stream-pulling terminal plays the audio-video frame, if there is a synchronously-played message, the stream-pulling terminal may synchronously play the audio-video frame and the corresponding message. If there is no synchronously-played message, the stream-pulling terminal may only play the audio-video frame. By controlling the timing of playing the message, the problem of being asynchronous caused by real-time playing of the pulled message may be avoided, thereby improving interaction and experience of the online live broadcast education.

Figure 8:
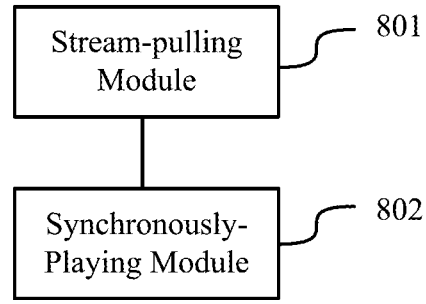
FIG. 8 is a schematic structural view of a stream-pulling terminal provided in an embodiment of the present disclosure.

On the basis of the same technical concept, an embodiment of the present disclosure further provides a stream-pulling terminal. As shown in FIG. 8, the stream-pulling terminal includes:

a stream-pushing module 801, configured to pull an audio-video stream from an audio-video server and play the audio-video stream, pull a message stream from a message server and cache the message stream, herein each audio-video frame in the audio-video stream is supplemented with an audio-video timestamp, each message in the message stream is supplemented with a message timestamp, and time sources taken by the audio-video timestamp and the message timestamp are synchronous time sources;

a synchronously-playing module 802, configured to determine a message in a cached message stream which is synchronously played with an audio-video frame to be played in accordance with the audio-video timestamp of the audio-video frame and the message timestamp of the message, and to play the message.

Alternatively, each audio-video frame in the audio-video stream is supplemented with an audio-video timestamp, and each message in the message stream is supplemented with a message timestamp includes:

each audio-video frame in the audio-video stream is supplemented with a local acquisition time written by a stream-pushing terminal into an SEI field, and each message in the message stream is supplemented with a local acquisition time written by the stream-pushing terminal into a timestamp field.

Alternatively, that each audio-video frame in the audio-video stream is supplemented with an audio-video timestamp, and each message in the message stream is supplemented with a message timestamp includes:

each audio-video frame in the audio-video stream is supplemented with an audio-video frame acquisition time written by the audio-video server into an SEI field, each message in the message stream is supplemented with a message acquisition time written by the message server into a timestamp field, and a server time of the audio-video server and a server time of the message server keep synchronous.

Alternatively, the synchronously-playing module 802 is configured to:

determine a message with a message timestamp in the message stream earlier than or the same as an audio-video timestamp of the audio-video frame to be played as a message played synchronously with the audio-video frame to be played.

Figure 9:
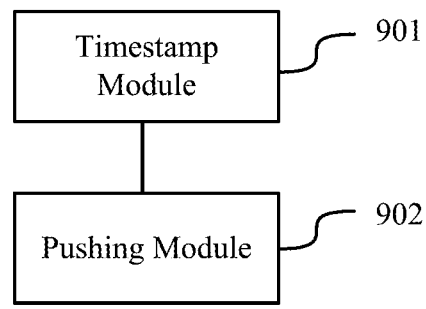
FIG. 9 is a schematic structural view of a stream-pushing terminal provided in an embodiment of the present disclosure.

Based on the same technical concept, an embodiment of the present disclosure further provides a stream-pushing terminal. As shown in FIG. 9, the stream-pushing terminal includes:

a timestamp module 901, configured to supplement an audio-video timestamp to each audio-video frame in a collected audio-video stream, and to supplement a message timestamp to each message in a collected message stream, herein a local time of a stream-pulling terminal is used in the audio-video timestamp and in the message timestamp;

a pushing module 902, configured to push the audio-video stream to an audio-video server, and to push the message stream to a message stream server.

Alternatively, the timestamp module 901 is configured to:

write a local acquisition time of each audio-video frame in the audio-video stream into an SEI field of an audio-video frame; and write a local acquisition time of each message in the message stream into a timestamp field of each message, so that the stream-pulling terminal determines a message in a cached message stream which is synchronously played with the audio-video frame to be played in accordance with the audio-video timestamp of the audio-video frame and the message timestamp of the message, and plays the message.

Alternatively, determining the message in the cached message stream which is synchronously played with the audio-video frame to be played in accordance with the audio-video timestamp of the audio-video frame and the message timestamp of the message includes:

determining a message with a message timestamp in the message stream earlier than or the same as an audio-video timestamp of the audio-video frame to be played as a message synchronously played with the audio-video frame to be played.

Figure 10:
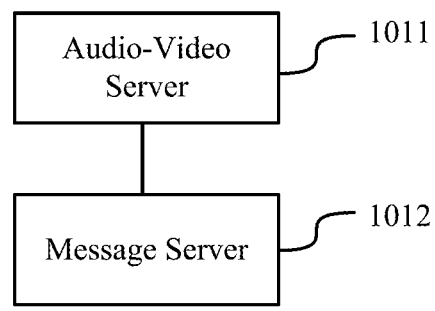
FIG. 10 is a schematic structural view of a system for synchronously playing a message stream and an audio-video stream provided in an embodiment of the present disclosure.

Based on the same technical concept, an embodiment of the present disclosure further provides a system for synchronously playing a message stream and an audio-video stream. As shown in FIG. 10, the system includes an audio-video server 1011 and a message server 1012.

The audio-video server 1011 is configured to receive an audio-video stream, and to supplement each audio-video frame in a received audio-video stream with an audio-video timestamp.

The message server 1012 is configured to receive a message stream, and to supplement each message in a received message stream with a message timestamp. Herein a server time of the message server and a server time of the audio-video server keep synchronous.

Alternatively, the audio-video server 1011 is configured to:

write an audio-video frame acquisition time into an SEI field of each audio-video frame in the received audio-video stream;

the message server 1012 is configured to:

write a message acquisition time into a timestamp field of each message in the received message stream, so that the stream-pulling terminal determines a message in a cached message stream which is synchronously played with the audio-video frame to be played in accordance with the audio-video timestamp of the audio-video frame and the message timestamp of the message, and plays the message.

Alternatively, determining a message played synchronously with the audio-video frame to be played in a cached message stream in accordance with the audio-video timestamp of the audio-video frame and the message timestamp of the message includes:

determining a message with a message timestamp in the message stream earlier than or the same as an audio-video timestamp of the audio-video frame to be played as a message synchronously played with the audio-video frame to be played.

Based on the same technical concept, an embodiment of the present disclosure further provides a system for synchronously playing a message stream and an audio-video stream. As shown in FIG. 1, the system includes a stream-pushing terminal, an audio-video server, a message server and a stream-pulling terminal as described above.

The stream-pushing terminal is configured to push the collected audio-video stream to the audio-video server, and to push the collected message to the message server.

The audio-video server is configured to supplement an audio-video timestamp to each audio-video frame in a received audio-video stream.

The message server is configured to supplement a message timestamp to each message in the received message stream. Herein a server time of the message server and a server time of the audio-video server keep synchronous.

The stream-pulling terminal is configured to pull an audio-video stream from the audio-video server and play the audio-video stream, pull a message stream from the message server and cache the message stream, determine a message in a cached message stream which is synchronously played with an audio-video frame to be played in accordance with the audio-video timestamp of the audio-video frame and the message timestamp of the message, and plays the message.

Based on the same technical concept, an embodiment of the present disclosure further provides a system for synchronously playing a message stream and an audio-video stream. As shown in FIG. 1, the system includes a stream-pushing terminal, an audio-video server, a message server and a stream-pulling terminal.

The stream-pushing terminal is configured to supplement an audio-video timestamp to each audio-video frame in a collected audio-video stream, and supplement a message timestamp to each message in a collected message stream;

The stream-pushing terminal is further configured to push the audio-video stream to an audio-video server, and to push the message stream to a message stream server;

the stream-pulling terminal is configured to pull an audio-video stream from the audio-video server and play the audio-video stream, pull a message stream from the message server and cache the message stream, determine a message in a cached message stream and synchronously played with an audio-video frame to be played in accordance with the audio-video timestamp of the audio-video frame and the message timestamp of the message, and play the message.

Those skilled in the art may appreciate that all or some steps that realize the above-described embodiments may be implemented through hardware, or may be implemented by instructing related hardware through a program which may be stored in a computer readable storage medium. The storage medium may be a read-only memory, a disc, or a compact disc.

The above-described are only preferably embodiments of the present disclosure, but is not used to impose a limitation to the present disclosure. Any amendment, equivalent substitution and improvement made within the spirit and principle of the present disclosure shall be included in the protection scope of the present disclosure.

What is claimed is:

1. A method for synchronously playing a message stream and an audio-video stream, wherein the method is executed at a stream-pulling terminal, comprising:
   pulling an audio-video stream from an audio-video server and playing the audio-video stream, pulling a message stream from a message server and caching the message stream;
       wherein each audio-video frame in the audio-video stream, transmitted from a stream-pushing terminal to the audio-video server via a connection channel established between the stream-pushing terminal and the audio-video server, is supplemented with an audio-video timestamp by the audio-video server, the audio-video timestamp representing a time that the audio-video server acquires the audio-video frame;
       wherein each message in the message stream, transmitted from the stream-pushing terminal to the message server via a connection channel established between the stream-pushing terminal and the message server, is supplemented with a message timestamp by the message server, the message timestamp representing a time that the message server acquires the message; and
       wherein a server time of the message server and a server time of the audio-video server keep synchronous;
   determining, in accordance with the audio-video timestamp of the audio-video frame and the message timestamp of the message, a message in a cached message stream synchronously played with an audio-video frame to be played, and playing the message.

2. The method in accordance with claim 1, wherein that each audio-video frame in the audio-video stream is supplemented with an audio-video timestamp, and each message in the message stream is supplemented with a message timestamp comprises:
   each audio-video frame in the audio-video stream is supplemented with an audio-video frame acquisition time written by the audio-video server into an SEI field, each message in the message stream is supplemented with a message acquisition time written by the message server into a timestamp field, and a server time of the audio-video server and a server time of the message server keep synchronous.

3. The method in accordance with claim 2, wherein the step of determining, in accordance with the audio-video timestamp of the audio-video frame and the message timestamp of the message, a message in the cached message stream synchronously played with the audio-video frame to be played comprises:
   determining a message with a message timestamp in the message stream earlier than or the same as an audio-video timestamp of the audio-video frame to be played as a message played synchronously with the audio-video frame to be played.

4. A stream-pulling terminal, wherein the stream-pulling terminal comprises: at least a processor and a memory, the memory being used to store computer-readable instructions which, when executed by the at least a processor, perform a method for synchronously playing a message stream and an audio-video stream;
   wherein the method comprises:
       pulling an audio-video stream from an audio-video server and playing the audio-video stream, pulling a message stream from a message server and caching the message stream;
       wherein each audio-video frame in the audio-video stream, transmitted from a stream-pushing terminal to the audio-video server via a connection channel established between the stream-pushing terminal and the audio-video server, is supplemented with an audio-video timestamp by the audio-video server, the audio-video timestamp representing a time that the audio-video server acquires the audio-video frame;
       each message in the message stream, transmitted from the stream-pushing terminal to the message server via a connection channel established between the stream-pushing terminal and the message server, is supplemented with a message timestamp by the message server, the message timestamp representing a time that the message server acquires the message; and a server time of the message server and a server time of the audio-video server keep synchronous;

determining a message in a cached message stream synchronously played with an audio-video frame to be played in accordance with the audio-video timestamp of the audio-video frame and the message timestamp of the message, and playing the message.

5. The stream-pulling terminal in accordance with claim 4, wherein each audio-video frame in the audio-video stream is supplemented with an audio-video timestamp, and each message in the message stream is supplemented with a message timestamp comprises:

each audio-video frame in the audio-video stream is supplemented with an audio-video frame acquisition time written by the audio-video server into an SEI field, each message in the message stream is supplemented with a message acquisition time written by the message server into a timestamp field, and a server time of the audio-video server and a server time of the message server keep synchronous.

6. The stream-pulling terminal in accordance with claim 5, wherein the method comprises:

determining a message with a message timestamp in the message stream earlier than or the same as an audio-video timestamp of the audio-video frame to be played as a message played synchronously with the audio-video frame to be played.

7. A system for synchronously playing a message stream and an audio-video stream, wherein the system comprises a stream-pulling terminal, a stream-pushing terminal, an audio-video server and a message server, wherein the stream-pushing terminal is configured to push the audio-video stream to the audio-video server via a connection channel established between the stream-pushing terminal and the audio-video server, and push the message stream to the message server via a connection channel established between the stream-pushing terminal and the message server;

the audio-video server is configured to receive the audio-video stream, and to supplement each audio-video frame in a received audio-video stream with an audio-video timestamp, the audio-video timestamp representing a time that the audio-video server acquires a respective audio-video frame;

the message server is configured to receive the message stream, and to supplement each message in a received message stream with a message timestamp, the message timestamp representing a time that the message server acquires a respective message;

the stream-pulling terminal is configured to:

pull an audio-video stream from the audio-video server and playing the audio-video stream, pull a message stream from the message server and cache the message stream determine a message in a cached message stream synchronously played with an audio-video frame to be played in accordance with the audio-video timestamp of the audio-video frame and the message timestamp of the message, and to play the message;

wherein a server time of the message server and a server time of the audio-video server keep synchronous.

8. The system in accordance with claim 7, wherein the stream-pulling terminal are configured to:

determine a message with a message timestamp in the message stream earlier than or the same as an audio-video timestamp of the audio-video frame to be played as a message played synchronously with the audio-video frame to be played.

9. The system in accordance with claim 7, wherein the audio-video server is configured to:

write an audio-video frame acquisition time into an SEI field of each audio-video frame in the received audio-video stream;

the message server is configured to:

write a message acquisition time into a timestamp field of each message in the received message stream, so that the stream-pulling terminal determines a message in a cached message stream and synchronously played with the audio-video frame to be played in a cached message stream in accordance with the audio-video timestamp of the audio-video frame and the message timestamp of the message, and plays the message.

* * * * *